(No Model.)
S. C. RUE.
MUSIC STAND CASE AND PORTFOLIO.
No. 456,433. Patented July 21, 1891.
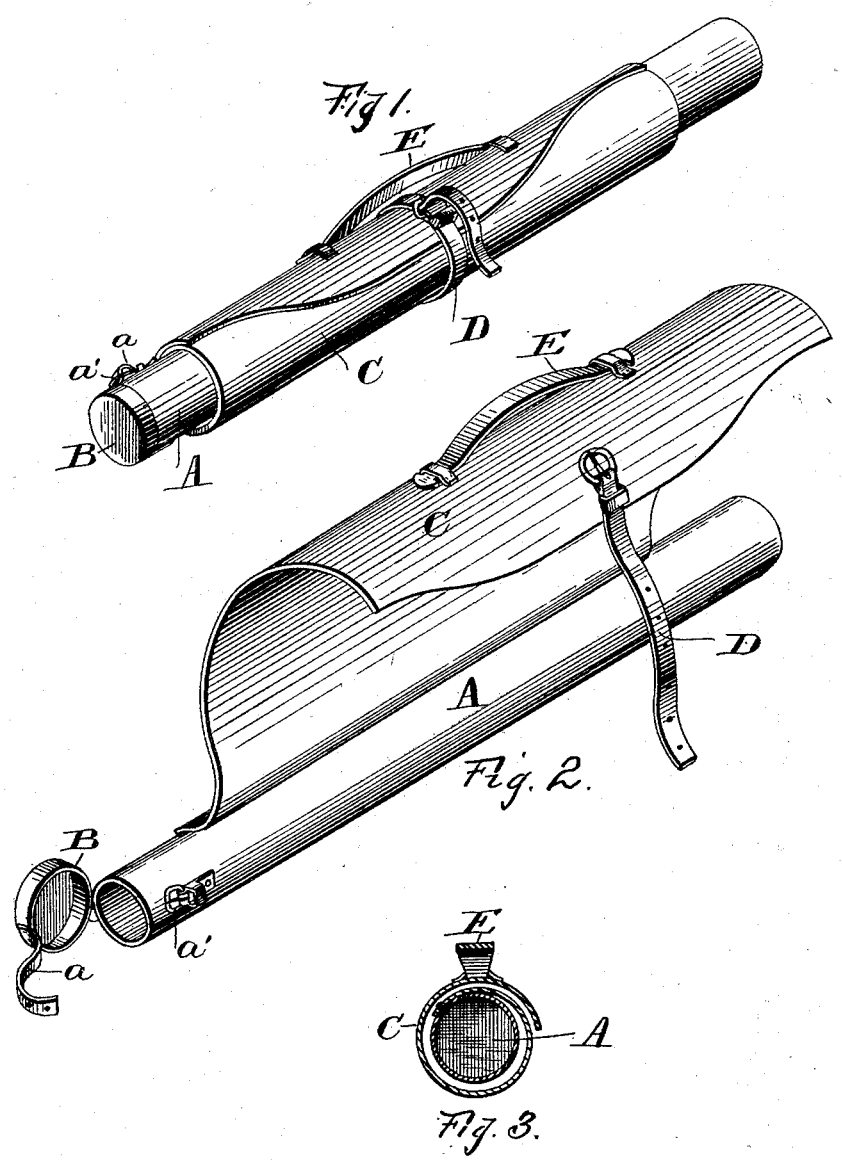
WITNESSES
F. L. Ourand
Van Buren Hillyard
INVENTOR
Samuel Charles Rue,
By Robt. H. Lacey
his Attorneys

UNITED STATES PATENT OFFICE.

SAMUEL CHARLES RUE, OF ASBURY PARK, NEW JERSEY.

MUSIC-STAND CASE AND PORTFOLIO.

SPECIFICATION forming part of Letters Patent No. 456,433, dated July 21, 1891.

Application filed January 10, 1891. Serial No. 377,357. (No model.)

*To all whom it may concern:*

Be it known that I, SAMUEL CHARLES RUE, a citizen of the United States, residing at Asbury Park, in the county of Monmouth and State of New Jersey, have invented certain new and useful Improvements in Music-Stand Cases and Music-Portfolios; and I do hereby declare the following to be a full, clear, and exact description of the invention, such as will enable others skilled in the art to which it appertains to make and use the same.

This invention relates to a combined case and music-portfolio.

The object of the invention is to provide in one structure a case to receive any well-known form of portable and knockdown music-stand after it has been reduced to a compact form either by folding, telescoping, or disconnecting the component parts of the said stand, and arranging them in close relation for storage, and a portfolio for music, whereby the said case and portfolio will mutually strengthen and protect each other, and the musician will be enabled to carry the music-stand and the music in one hand and in one package.

The improvement consists, essentially, of a case having closed sides and an open end, which end is closed by a cap, and a portfolio secured at one end to the case and adapted to roll thereon and provided at its free end with a handle and with a fastening-strap.

In the drawings, Figure 1 is a perspective view of the invention, showing the portfolio-roller around the case. Fig. 2 is a perspective view, the portfolio being unrolled, of the invention. Fig. 3 is a cross-section through the middle of the invention as it appears in Fig. 1.

The case A, which is designed to receive a music-stand after it has been reduced to a compact form for storage, is cylindrical in form and preferably closed at one end and open at the opposite end, which end is closed by the cover B, that is connected at one side with the case by a short strap which forms a hinge, and which is fastened at the opposite side by the strap and buckle $a\ a'$. The case is formed of suitable material, leather being preferable, owing to its flexibility and toughness. The portfolio C is flexible, and is secured at one end to the case and is provided at its opposite end with the strap D, which is fastened thereto, and which passes around the roll and holds it closed, as shown in Figs. 1 and 3, and with the handle E, the latter affording a convenient means for carrying the package. The case, being attached to one end of the portfolio, serves to keep the same distended when placing the music therein, and the music and portfolio when rolled around the case protects the same. The ends of the case projecting beyond the edges of the portfolio prevent injury to the music.

Having thus described my invention, what I claim, and desire to secure by Letters Patent, is—

The hereinbefore-specified combined case and music-portfolio for the purposes set forth, composed of a case closed on its sides and open at one end, a cover for closing the said open end, and a flexible portfolio attached at one end to the case and adapted to be rolled thereon and provided at its opposite end with a fastening-strap and a carrying-handle, substantially as shown and described.

In testimony whereof I affix my signature in presence of two witnesses.

SAMUEL CHARLES RUE.

Witnesses:
EDMUND E. DAYTON,
W. W. DAVIS.